United States Patent
Yamamoto

(10) Patent No.: US 7,876,473 B2
(45) Date of Patent: Jan. 25, 2011

(54) APPARATUS AND METHOD FOR INFORMATION BURYING

(75) Inventor: Naofumi Yamamoto, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 582 days.

(21) Appl. No.: 11/874,445

(22) Filed: Oct. 18, 2007

(65) Prior Publication Data

US 2009/0103140 A1    Apr. 23, 2009

(51) Int. Cl.
*H04N 1/405* (2006.01)

(52) U.S. Cl. .................. 358/1.9; 358/3.09; 358/3.28; 382/100; 382/294

(58) Field of Classification Search .................. 358/1.9, 358/3.01, 3.07, 3.09, 3.11, 3.12, 3.26, 3.28; 382/100, 294

See application file for complete search history.

(56) References Cited

U.S. PATENT DOCUMENTS

| | | | | |
|---|---|---|---|---|
| 6,741,758 B2 * | 5/2004 | Hayashi et al. | ............. | 382/294 |
| 7,277,557 B2 * | 10/2007 | Ihara | ............. | 382/100 |
| 2004/0036924 A1 * | 2/2004 | Ihara | ............. | 358/3.28 |
| 2007/0297644 A1 * | 12/2007 | Ishikawa et al. | ............. | 382/100 |
| 2008/0074456 A1 * | 3/2008 | Tatsumi | ............. | 347/15 |

FOREIGN PATENT DOCUMENTS

| | | |
|---|---|---|
| JP | 2003-209676 | 7/2003 |
| JP | 2003-264686 | 9/2003 |

\* cited by examiner

*Primary Examiner*—Kimberly A Williams
(74) *Attorney, Agent, or Firm*—Turocy & Watson, LLP

(57) ABSTRACT

A dot pattern including a set of plural dots arranged substantially periodically is formed. When positions of the plural dots are shifted dot by dot, a combination of an amount and a direction of shift of dot positions to be shifted is changed. A pattern obtained by repeating, for each predetermined period, a pattern processed in this way is superimposed on an image. Sizes of the respective dots are the same and only dot positions of the dots are shifted. Therefore, plural dot patterns having different amounts and directions of shift of dot positions visually look like uniform patterns and a sense of hindrance is low.

11 Claims, 9 Drawing Sheets

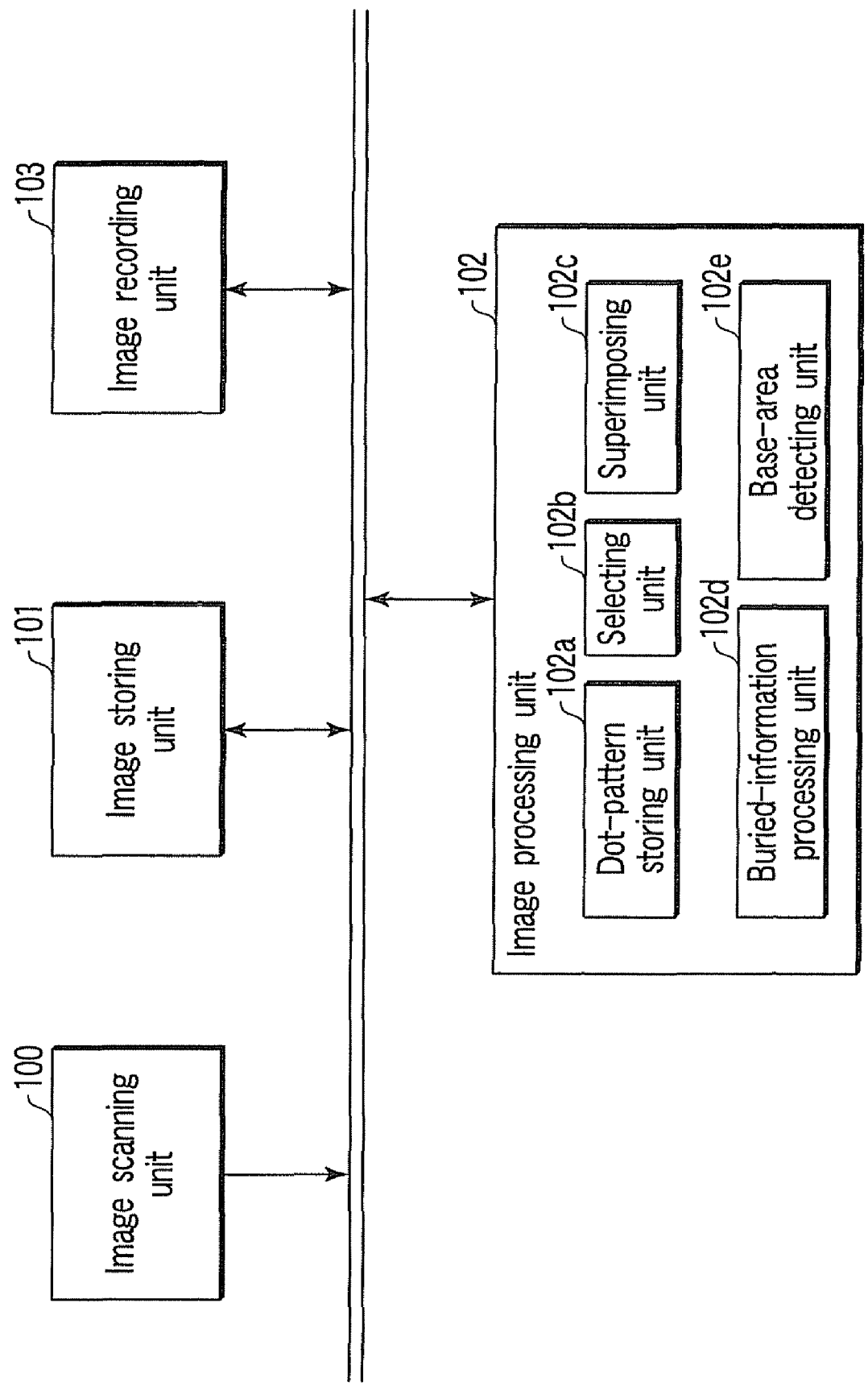
F I G. 1

Pattern 1

Pattern 2

Pattern 3

Pattern 4

Pattern 5

Pattern 6

Pattern 7

Pattern 8

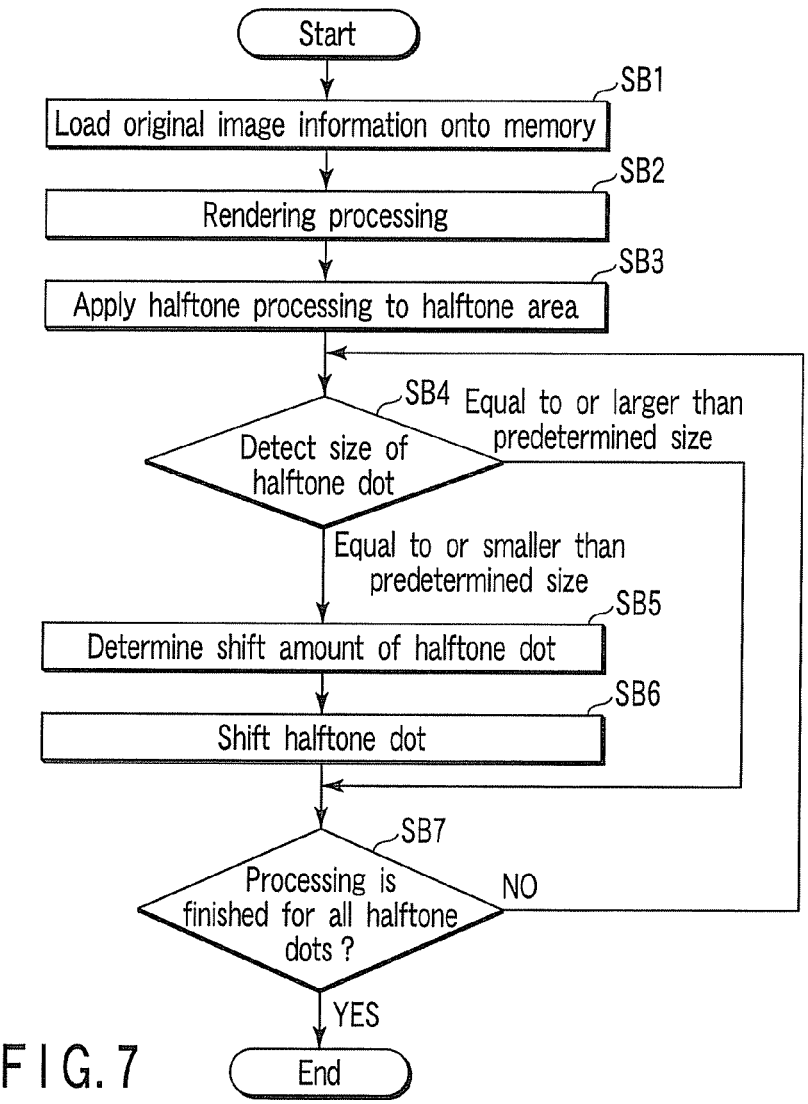
F I G. 7
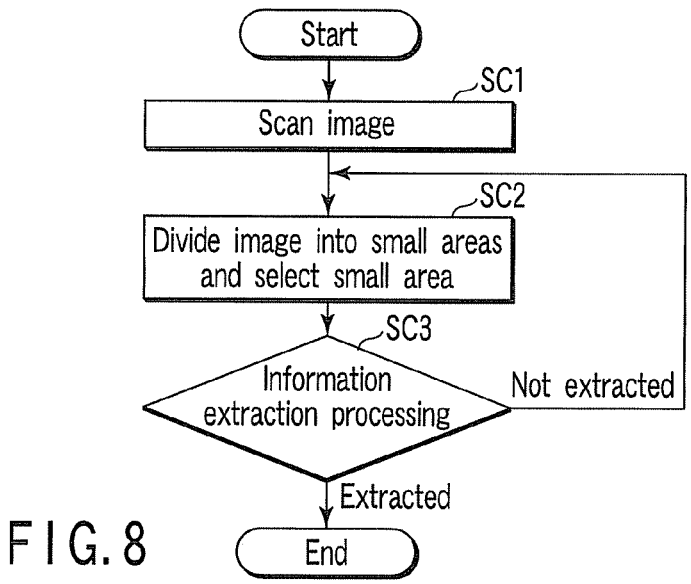
F I G. 8

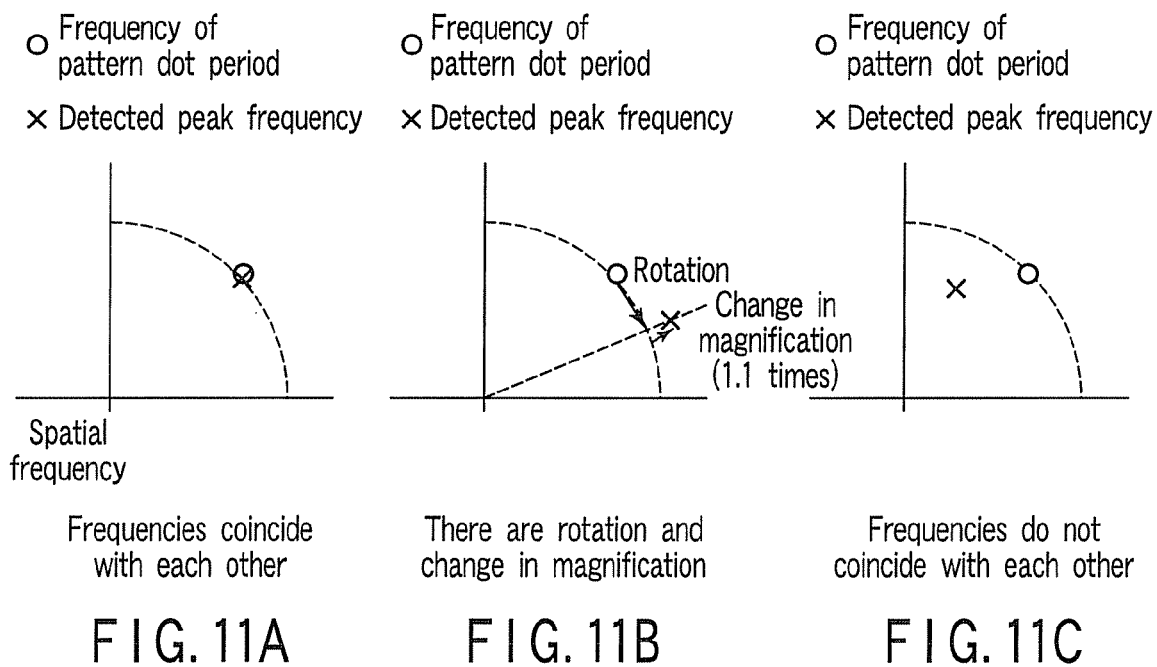
FIG. 11A  Frequencies coincide with each other
FIG. 11B  There are rotation and change in magnification
FIG. 11C  Frequencies do not coincide with each other
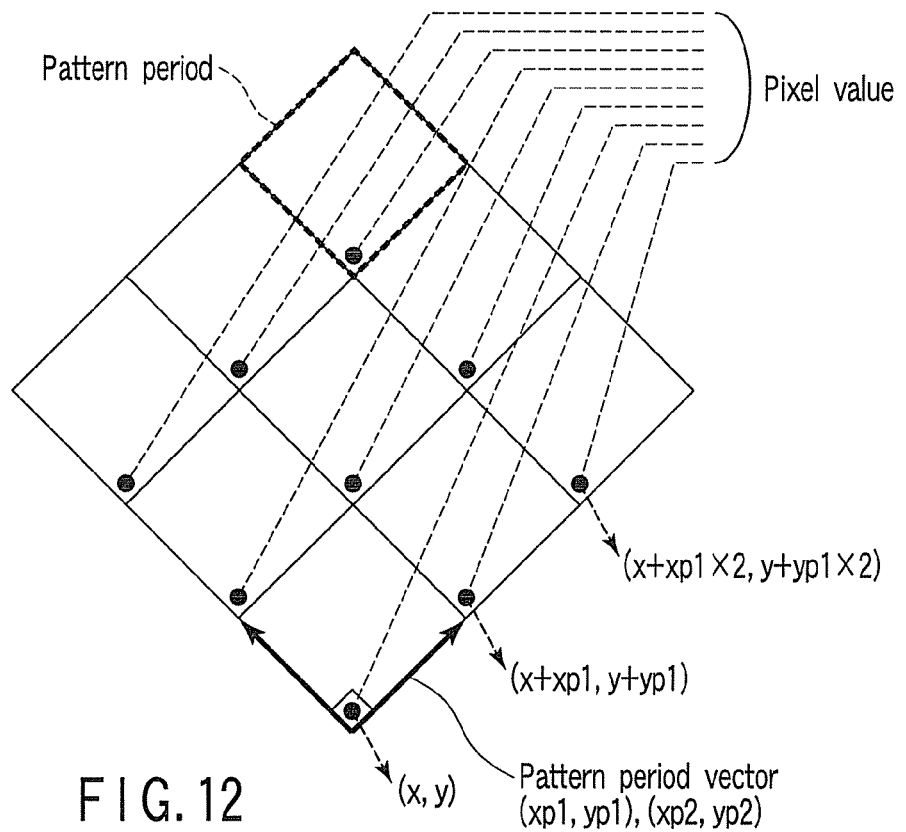
FIG. 12

APPARATUS AND METHOD FOR INFORMATION BURYING

BACKGROUND OF THE INVENTION

1. Field of the Invention

The present invention relates to an information burying apparatus and method for burying information in an image and further relates to a method of detecting buried information. In particular, the present invention develops a burying method for making buried information less conspicuous.

2. Description of the Related Art

By superimposing information other than an image on the image, it is possible to record secondary information concerning the image. As such secondary information, it is possible to bury information during image creation, for example, information concerning a printing date and time, a printing person, a printer, and the like. This makes it possible to prevent manipulation and counterfeiting of an image and an image print using this secondary information.

As a method of superimposing information on an image, a system described below is known in the past.

JP-A-2003-209676 discloses a system with which plural patterns having different spatial frequencies are prepared, a combination of these patterns is selected according to content of information to be buried, and the patterns are arranged on an image. When this image is scanned by a scanner, filtering for detecting the respective patterns is performed and a filter output of the image is compared with reference information. Consequently, it is possible to specify types of patterns in respective areas of the image. It is possible to reproduce the buried information by checking a combination and an arrangement of these patterns. In this system, plural dots are arrayed from a predetermined frequency in the respective patterns. Therefore, an overall pattern including a combination of these patterns is recognized as an aperiodic and irregular pattern and a feeling of noise in an image is caused.

JP-A-2003-2646868 discloses a method of burying information in an image by changing parameters of a dither method. Specifically, according to switching of threshold data of a dither matrix, a shape and a phase of a dither pattern changes according to buried information. This makes it unnecessary to apply substantial change or addition to a circuit in the past and makes it possible to easily perform burying of information. However, in this system, although it is possible to change a phase of a dither pattern, it is impossible to change the phase for each of dots. Therefore, reference information is necessary to detect a phase of a pattern. For that purpose, it is necessary to print reference information such as register and detect the reference information or detect an edge of paper. As a result, processing is complicated.

BRIEF SUMMARY OF THE INVENTION

According to an embodiment of the present invention, there is provided an apparatus and a method for burying information in an image and a method of detecting buried information that can bury information concerning a pattern without a feeling of noise for a user in an image and easily detect buried information.

According to an embodiment of the present invention, a pattern including a set of plural dots substantially periodically arranged on an image is formed. When positions of the plural dots are shifted dot by dot, a combination of an amount and a direction of shift in a dot position to be shifted is changed according to buried information. Dot patterns obtained by repeating, for each predetermined period, a dot pattern processed in this way are superimposed on the image. Sizes of the respective dots are the same and only the dot positions of the dots are shifted. Therefore, plural dot patterns having different amounts and directions of shift of dot positions visually look like uniform patterns and a sense of hindrance is low.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing the structure of an information burying apparatus according to a first embodiment of the present invention;

FIG. 7 is a diagram showing a processing flow in a third embodiment;

FIG. 8 is a diagram showing a flow of an image processing operation in a fourth embodiment;

FIGS. 11A to 11C are diagrams showing examples of a frequency peak;

FIG. 12 is a schematic diagram showing an iterative addition; and

DETAILED DESCRIPTION OF THE INVENTION

Figure 2:
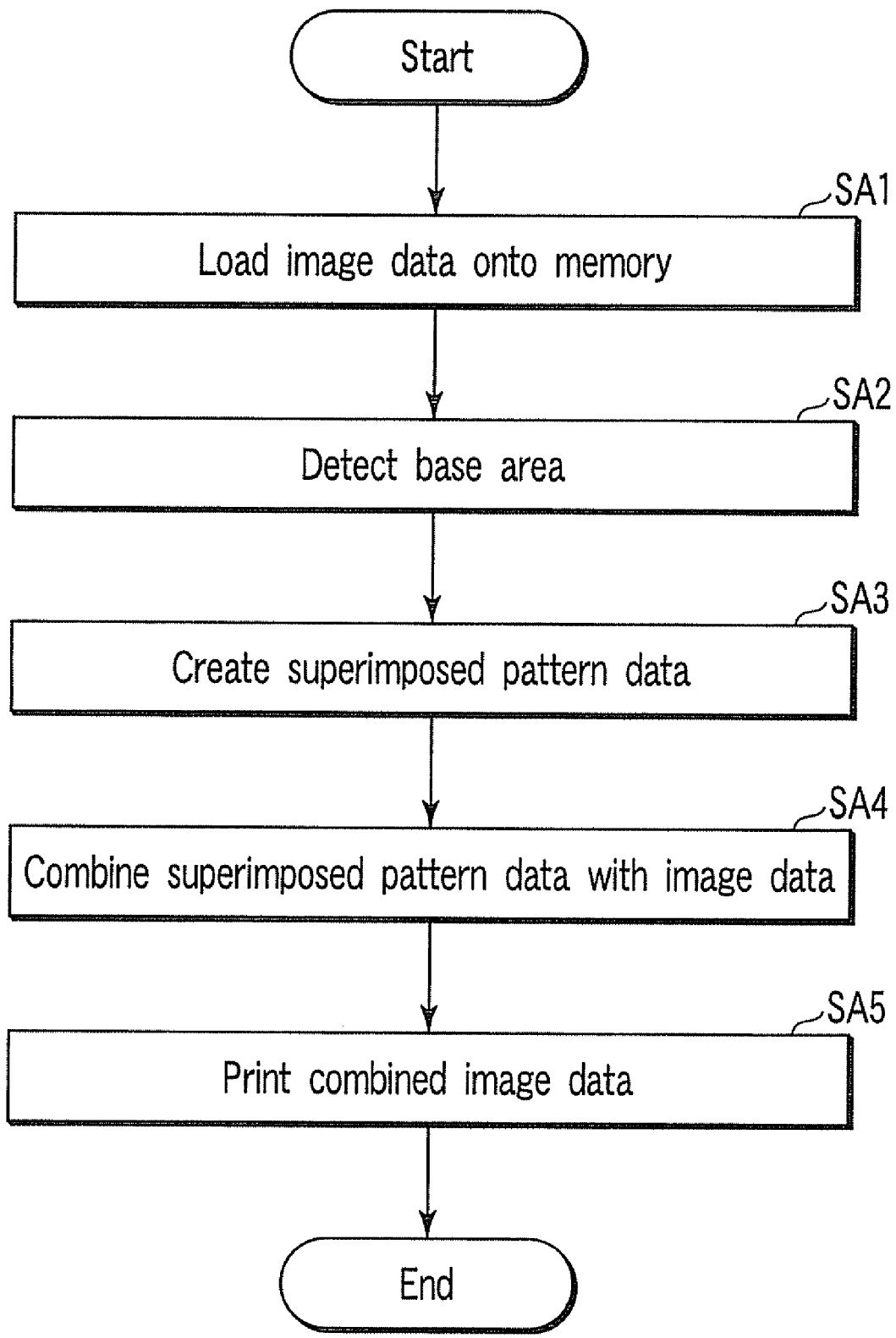
FIG. 2 is a diagram representing a flow of a burying processing operation in the first embodiment.

Embodiments of the present invention will be hereinafter explained with reference to the drawings.

First Embodiment

A first embodiment in which the present invention is applied to an information burying apparatus is explained. This apparatus buries, on the basis of an inputted image and buried information, information in a base portion of an image, i.e., a portion of a white base in which characters, photographs, and the like are not recorded and outputs the information.

FIG. 1 shows a schematic structure of this apparatus. This apparatus has an image scanning unit 100, an image storing unit 101, an image processing arithmetic unit 102, and an image recording unit 103. The image scanning unit 100 is, for example, a scanner. Image data scanned by the image scanning unit 100 is stored in the image storing unit 101. The image storing unit 101 is a storage device such as a hard disk or a semiconductor memory. The image data stored in the image storing unit 101 is read into the image processing unit 102.

The image processing unit 102 includes a CPU (Central Processing Unit) and a memory, and, if necessary, an accelerator. The memory stores image information and performs storage of a result obtained in the middle of an arithmetic operation, storage of a processing program, and the like.

The image processing unit 102 performs processing for burying information. The image recording unit 103 prints a result of burying the information on paper and outputs the result. An operation in the image processing unit 102 is the point of the present invention. A processing flow of this operation is explained in detail below. First, functional blocks of the image processing apparatus 102 are explained. The image processing apparatus 102 has, for example, a storing unit 102a, a selecting unit 102b, and a superimposing unit 102c. The storing unit 102a stores plural dot patterns. In a dot pattern, dots are two-dimensionally arrayed and repeated generally at a predetermined period. The plural dot patterns are formed by shifting positions of the respective dots from positions at the predetermined period by a very small amount. The selecting unit 102b selects a dot pattern out of the plural dot patterns in the storing unit 102a according to information to be buried. The superimposing unit 102c superimposes the dot pattern selected by the selecting unit 102b on an image. The image processing unit 102 also includes a buried-information processing unit 102d. The buried-information processing unit 102d is a unit that creates or temporarily stores buried information. Moreover, the image processing unit 102 includes a base-area detecting unit 102e that detects a base area of an image. The selected dot pattern is superimposed on the detected base area.

FIG. 2 shows a flow of a processing operation in the image processing unit 102. First, in step SA1, the image processing unit 102 loads an original image read out from the image storing unit 101 onto the memory of the image processing unit 102.

Image data loaded onto the memory is represented by a monochrome binary bitmap signal. Here, for convenience of explanation, a monochrome image is treated. However, a color image is different from the monochrome image only in that components are four components of CMYK. An operation flow for the color image is the same as that for the monochrome image.

Next, in step SA2, the image processing unit 102 performs detection of a base area. The base area is an area on an image in which there is no print data. Base area detection is briefly explained.

First, the image processing unit 102 applies expansion processing to a black image. This expansion processing is processing for, for example, replacing all pixels within a predetermined distance from black pixels with black pixels. An area in which pixels left as white pixels by this processing is set as a base area. As the predetermined area, for example, length of four pixels is set. Consequently, a character and four pixels around the character do not form the base area. As described later, since a pattern is superimposed only on the base area, by performing this processing, the pattern is superimposed on the character and near edge of the character and it is possible to prevent visibility of the character from deteriorating.

In the next step SA3, the image processing unit 102 performs creation of a buried pattern. Here, the image processing unit 102 creates a block of a superimposed pattern corresponding to predetermined buried information. In this embodiment, the image processing unit 102 uses four types of pattern blocks and buries 2-bit information according to the pattern blocks.

Figure 3A:
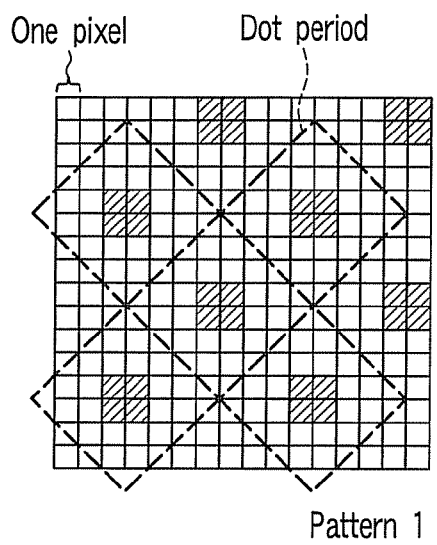
FIGS. 3A to 3D are diagrams showing examples of the structure of a buried pattern in the first embodiment.
Figure 3B:
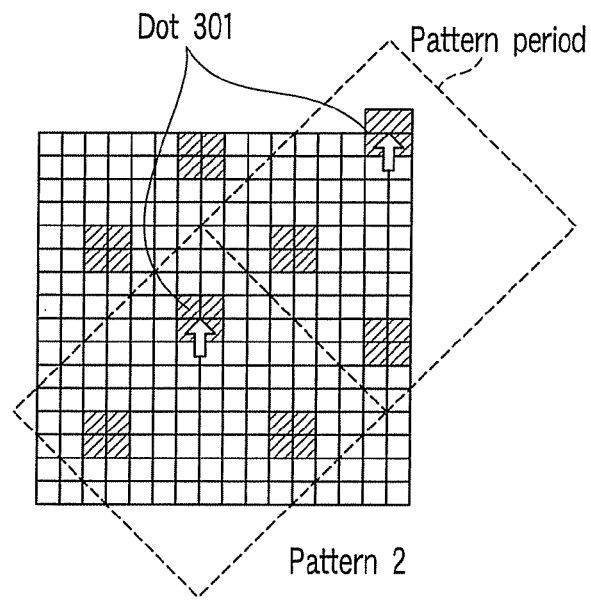
Figure 3C:
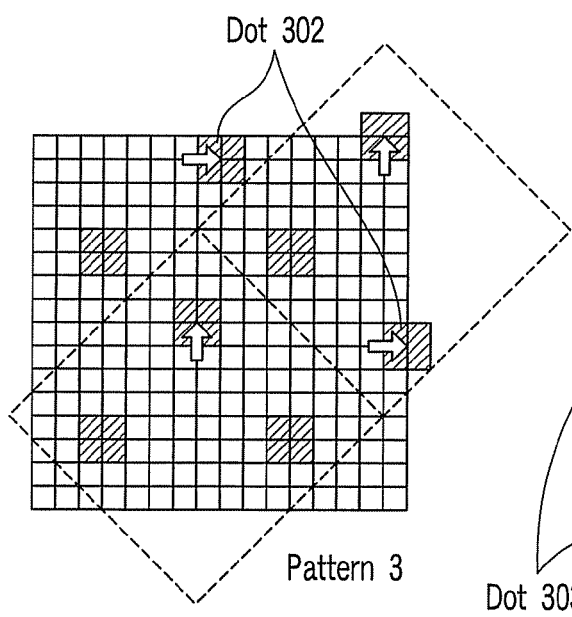
Figure 3D:
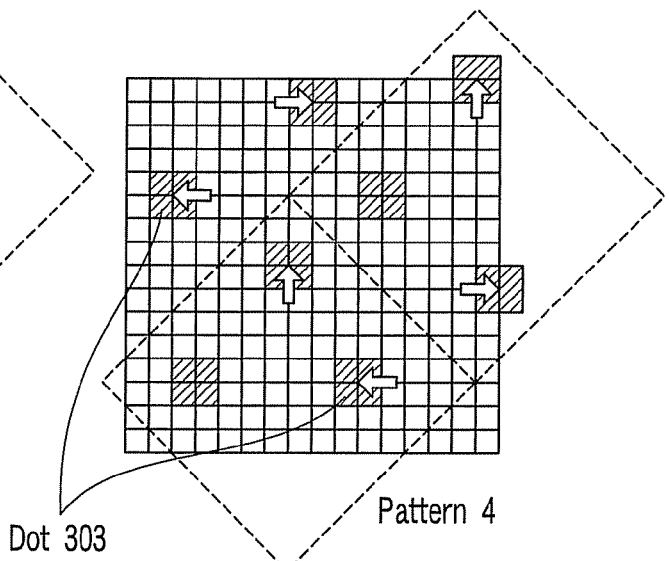
Figure 4A:
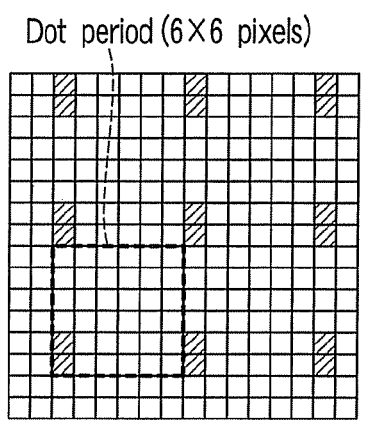
FIGS. 4A to 4H are diagrams showing modifications of the buried pattern in the first embodiment.
Figure 4B:
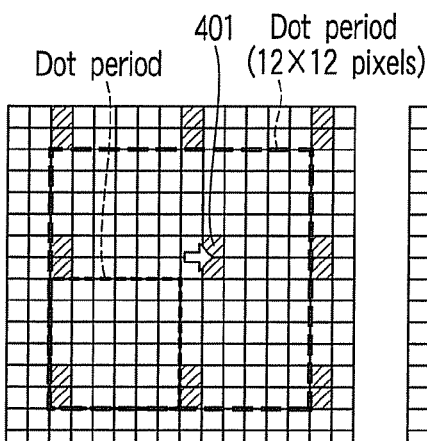
Figure 4C:
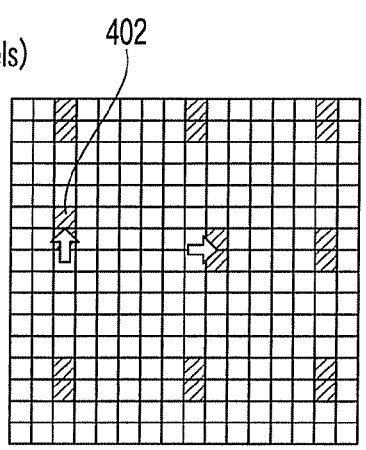
Figure 4D:
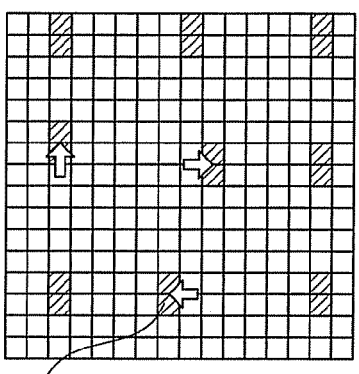
Figure 4E:
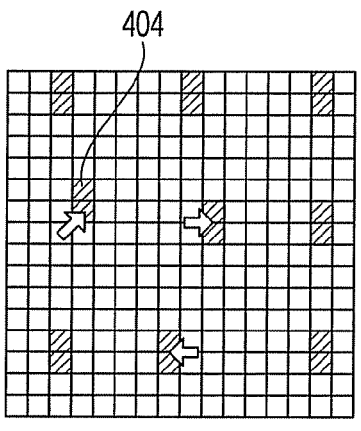
Figure 4F:
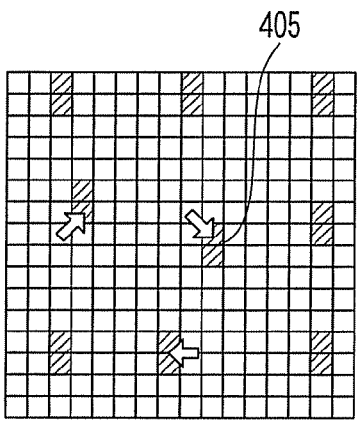
Figure 4G:
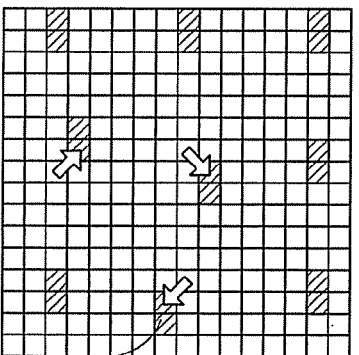
Figure 4H:
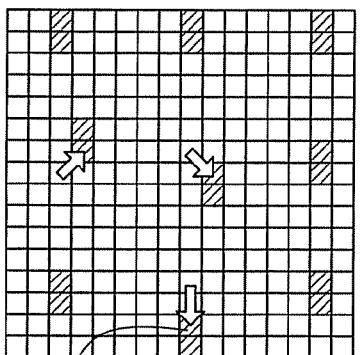

FIGS. 3A, 3B, 3C, and 3D show examples of four types of patterns. A pattern 1 in FIG. 3A is a basic pattern. Dots of 2×2 pixels are regularly arranged in an oblique direction at a period indicated by broken line blocks. This period is referred to as a dot period. A pattern 2 in FIG. 3B is a pattern obtained by shifting two dots 301 among four dots, which are arranged in the oblique direction in the pattern 1, in an upward direction (indicated by a bold arrow in the figure). This pattern is repeated at a period indicated by a dotted line block. This period is referred to as a pattern period. In this embodiment, the pattern period is obtained by doubling the dot period in an oblique upper right direction and an oblique upper left direction.

Here, (a pair of) vectors of two sides of a square forming one block of dots is referred to as dot period vectors and vectors of two sides of a square forming one block of the pattern period are referred to as pattern period vectors.

In the patterns shown in FIGS. 3A, 3B, 3C, and 3D in this embodiment, the dot period vectors are represented as (4, 4) and (−4, 4) in units of pixels. The pattern period vectors are represented as (8, 8) and (−8, 8) in units of pixels. In this embodiment, since a size of 600 dpi, i.e., one pixel is ⅙₀₀ inch=42 microns, in micron units, the vectors have values about 42 times as large as those described above.

A pattern 3 is a pattern obtained by further shifting dots 302 to the left side. A pattern 4 is a pattern obtained by further shifting dots 303 to the right side.

One of these four patterns is selected according to information to be buried. For example, when 2 bits of the information to be buried are "00", the pattern 1 is selected. When the 2 bits are "01", the pattern 2 is selected. When the 2 bits are "10", the pattern 3 is selected. When the 2 bits are "11", the pattern 4 is selected.

None of these four patterns becomes the same as the other even if the patterns are rotated, respectively. Therefore, the four patterns do not depend on a direction of an original. In other words, there is an advantage that, even if the original is rotated 90 degrees or 180 degrees, it is possible to correctly detect any one of the patterns.

In this embodiment, one dot is formed in a size of 2×2 pixels and the dot period and the pattern period are in an oblique direction. However, the size, the dot period, and the pattern period are not limited to this. The number of patterns is four types. However, the number of patterns is not limited to this.

Other patterns are shown in FIGS. 4A to 4H. In the patterns, a size of dots is 2×1 pixels, a dot period is in a block of 6×6 pixels, and a pattern period is in a block of 12×12 pixels. In this example, eight types of patterns are prepared. In a pattern 2, compared with a pattern 1, a dot 401 is shifted in the right direction. In a pattern 3, compared with the pattern 2, a dot 402 is shifted in the upward direction. In a pattern 4, compared with the pattern 3, a dot 403 is shifted in the left direction. In a pattern 5, compared with the pattern 4, a dot 404 is shifted in the upper right direction. In a pattern 6, compared with the pattern 5, a dot 405 is shifted in the lower right direction. In a pattern 7, compared with the pattern 6, a dot 406 is shifted in the lower left direction. In a pattern 8, compared with the pattern 7, a dot 407 is shifted in the downward direction.

Next, in step SA4 shown in FIG. 2, the image processing unit 102 performs combination of buried patterns. The image processing unit 102 performs this processing in order described below. The image processing unit 102 creates an image in which the base area detected in step SA2 is masked with the buried pattern created in step SA3. In other words, the image processing unit 102 creates an image in which a pixel value is 0 in areas other than the base area and a pixel value in the base area is a pixel value of a buried pattern image. This can be realized by an AND operation for each of the pixels. The image processing unit 102 superimposes this image on the original image. This is realized by an OR operation for each of the pixels.

In this embodiment, the base area detection in step SA2 is performed in order to prevent deterioration in visibility of characters due to superimposition of a pattern on a print area of characters and the like. However, a method of uniformly superimposing a pattern on the print area of characters and the like may be adopted. In this case, the base area detection processing in step SA2 is unnecessary.

Figure 5:
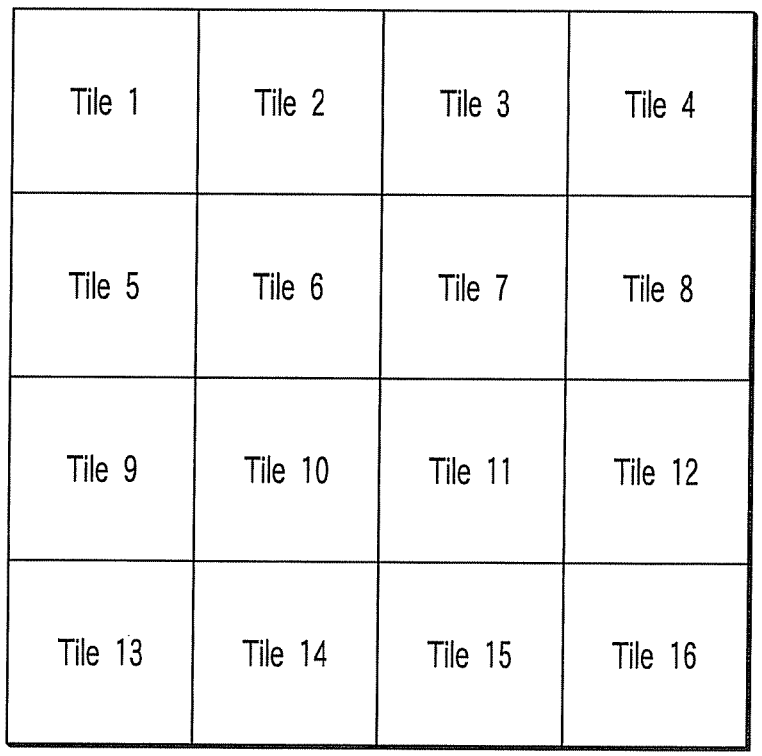
FIG. 5 is a diagram for explaining an example of tile division in the first embodiment.

In this embodiment, the same pattern is superimposed over the entire image. Therefore, only an amount of information corresponding to types of patterns (as explained above, when there are four types of patterns, 2-bit information) can be buried. As a method of increasing an amount of information to be buried, for example, as shown in FIG. 5, an image is divided into sixteen tiles and an independent pattern is selected and superimposed for each of the tiles. This makes it possible to bury an amount of information several times as large as the number of tiles. In the case of sixteen tiles, it is possible to bury an amount of information of 32 bits. In other words, plural pieces of any one of the patterns 1 to 4 shown in FIG. 3 are buried for one tile.

The patterns described above have the same size and the same shape of dots and only dot positions are shifted by buried information. Thus, it is difficult to visually recognize differences in density and texture. Further, all the dots are not shifted but a relative positional relation among plural dots is changed. Thus, it is possible to reproduce buried information only by analyzing these patterns without adding information serving as a reference position such as register.

Second Embodiment

Figure 6:
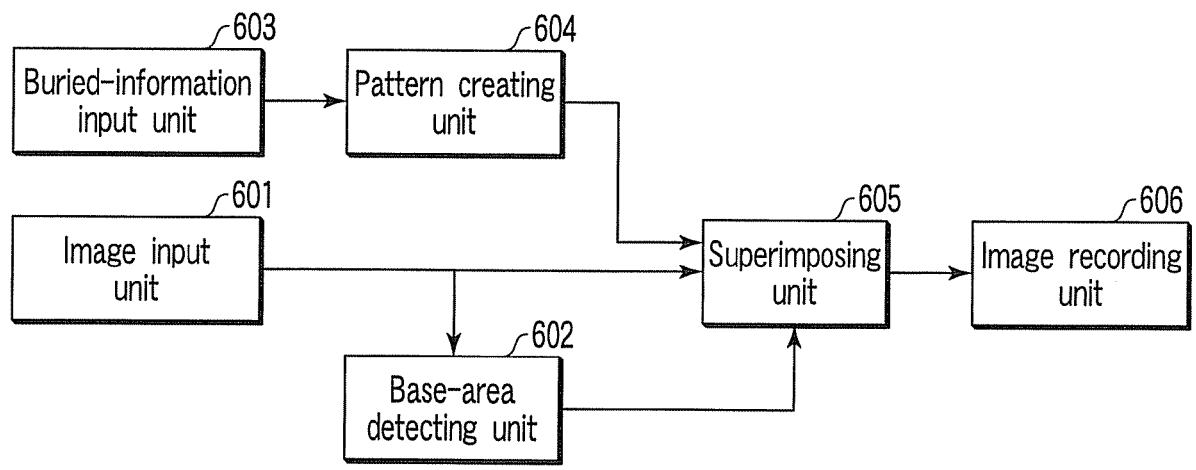
FIG. 6 is a diagram showing an example of the structure according to a second embodiment.

A second embodiment is explained. In the first embodiment, the information burying processing is performed by software. However, the gist of the present invention is not limited to this. In this embodiment, information burying processing is performed by hardware. The structure of an image processing apparatus according to this embodiment is shown in FIG. 6. Processing in this embodiment is briefly explained below.

First, an image input unit 601 inputs an image, in which information is buried, as an image signal. A base-area detecting unit 602 detects a base area where characters and the like are not printed. A method of detection is the same as that in the first embodiment. This embodiment is different from the first embodiment in that the base-area detecting unit 602 is configured by a hardware circuit.

On the other hand, a buried-information input unit 603 inputs information that should be buried. The information is, for example, 2-bit information. A pattern creating unit 604 selects any one of the four types of patterns shown in FIG. 3 according to this information and creates a pattern signal. A superimposing unit 605 superimposes the created pattern signal on an area detected as the base area. The superimposing unit 605 directly outputs the input image signal in areas other than the base area. The superimposing unit 605 outputs the output image signal created by the superimposing unit 605 to an image recording unit 606. The image recording unit 606 records the output image signal on paper.

Content to be processed is the same as that in the first embodiment. In this embodiment, since the processing is performed by hardware and images are sequentially processed as raster signals, it is possible to execute the processing at high speed with a small circuit size.

Third Embodiment

A third embodiment of the present invention is explained. This embodiment is burying of information in a halftone area. Whereas information is buried in a base area of an image in the first embodiment, in this embodiment, information is buried in a halftone area of a photograph or the like. In the first embodiment, it is possible to bury information even if there is no halftone area in an original image. However, since a halftone dot pattern not present in the original image is added to the base area, the image is slightly unsightly.

In this embodiment, a halftone area needs to be present in an original image. However, there is an advantage that, since information is buried in this halftone area, the look of an image hardly changes.

Since components of an apparatus according to this embodiment are the same as those in the embodiments shown in FIGS. 1 and 6, explanation of the components is omitted. A processing flow in this embodiment is explained in detail. The processing flow in this embodiment is shown in FIG. 7.

In step SB1, the image processing unit 102 reads original image information represented in a PDL (Page Description Language) of an original image onto the memory. Next, in step SB2, the image processing unit 102 performs rendering. In other words, the image processing unit 102 converts an image represented in the PDL into a bitmap image corresponding to described content. In step SB3, the image processing unit 102 applies halftone processing to a halftone area of the bitmap image.

In the halftone processing, a dither method is used. As a dither pattern, a pattern of a halftone dot type having a regular period is used. In step SB4, the image processing unit 102 performs detection of a size of a halftone dot. Since it is likely that noise and fluctuation in density occur because of shift of a halftone dot when a size of the halftone dot is large and a distance between the halftone dot and an adjacent halftone dot is small, this detection is performed for the purpose of preventing the occurrence of noise and fluctuation in density. In other words, when the halftone dot comes into contact with the adjacent halftone dot because of the shift or, even if halftone dots are not in contact with each other on a signal, the halftone dots come into contact with each other on recording paper because of a characteristic of a recording system, density of pixels of the halftone dot becomes unstable or increases. Consequently, noise and density fluctuation occur to cause image quality deterioration. Therefore, in step SB4, the image processing unit 102 detects whether halftone dots are equal to or smaller than a predetermined size in advance. When the halftone dot is equal to or larger than the predetermined size, since shift of the halftone dot is not performed, steps up to step SB7 are skipped.

In step SB5, the image processing unit 102 determines a moving direction and a moving amount of the halftone dot according to a position of the halftone dot and information to be buried. In step SB6, the image processing unit 102 performs shift of the halftone dot on the basis of the moving direction and the moving amount determined in step SB5.

The image processing unit 102 repeats, for each of halftone dots, the steps from step SB4 to step SB7 and repeats the processing until the processing is finished for the entire halftone area of the image.

According to the processing described above, it is possible to bury the information in the image using the moving direction and the moving amount of the halftone dot. In this embodiment, since the information is buried in the area obtained by subjecting the original halftone area to the halftone processing as described above, unlike the first embodiment, a pattern is not formed in the base area. It is also possible to provide, for the original halftone area, an image with less feeling of noise by applying the present invention.

In this embodiment, in steps SB4 to SB6, the detection of a size of the halftone dot and the shift of the halftone dot are performed. However, this may take time. Thus, as a modification of this embodiment, a system for switching the dither pattern used in step SB3 according to information to be buried may be adopted.

For example, a dither threshold pattern for creating a dither pattern in which a halftone dot position is shifted is calculated and created in advance and the dither threshold pattern is switched according to information to be buried. This makes it possible to perform shift of a halftone dot without performing the processing in steps SB4 to SB6. In this modification, it is necessary to prepare dither patterns equivalent to an amount of information to be buried. However, processing can be performed at high speed. The modification is suitable for performing the processing with hardware.

Fourth Embodiment

A fourth embodiment employing the present invention is explained. This embodiment is an apparatus that reads an image in which information is buried by the first to third embodiments and reproduces the buried information. The structure of this apparatus and a processing flow of an image processing unit are shown in FIG. 8.

Figure 9:
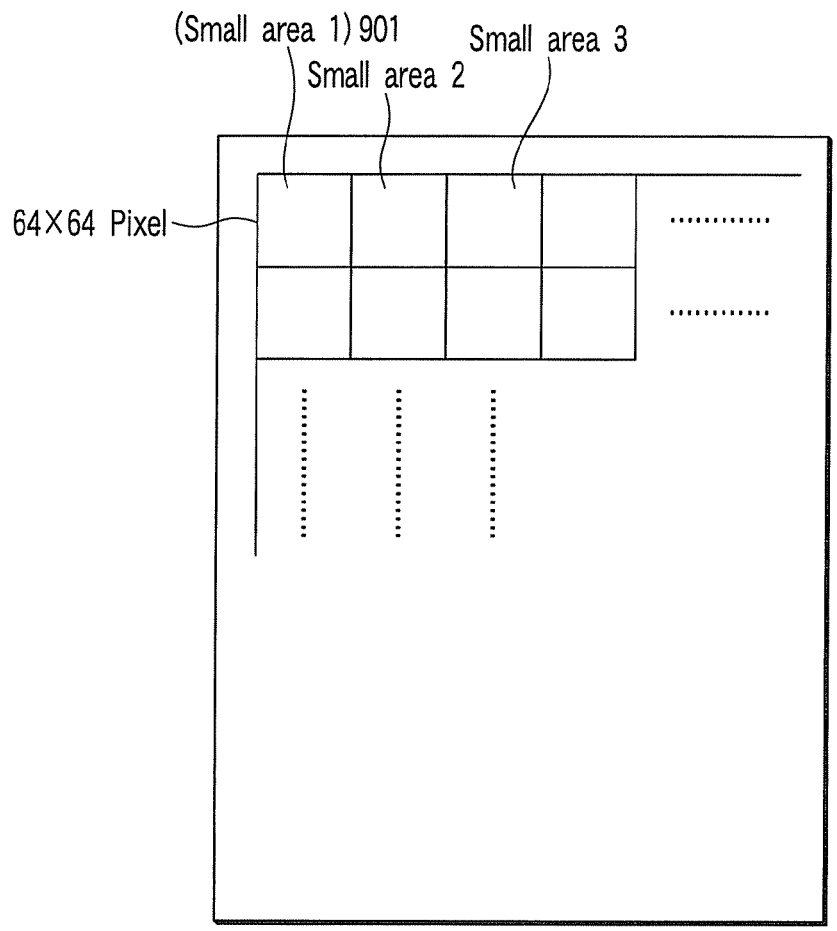
FIG. 9 is a diagram for explaining an example of division of small areas in the fourth embodiment.

Operations and processing contents in this embodiment are explained below. First, in step SC1, the image processing unit scans an original image. Next, in step SC2, the image processing unit divides the image into small areas and selects one small area. Here, for example, as shown in FIG. 9, the image processing unit divides the original image into small areas having a size of 64×64 pixels and, first, selects a small area 901 on the upper left. The size of the small areas is desirably several times as large as a period of a buried pattern. When the size is too large, a calculation scale of a spectrum analyzing unit described later becomes enormous. When the size is too small, the number of patterns in the small areas decreases as described later. Thus, accuracy of extraction of information falls because of noise and the like.

In step SC3, the image processing unit applies processing for extracting buried information to the selected small area. Details of the information extraction processing are described later. In this step, a result indicating whether it is possible to extract information and the information extracted when it is possible to extract the information are outputted. When no buried pattern is present in this small area or, even if a buried pattern is present, only a part of the buried pattern is present, it is impossible to extract the buried information. In such a case, in this step, a result indicating that it is impossible to extract information is outputted. When it is impossible to extract information, the image processing unit returns to step SC2, selects the next small area, and returns to step SC3 again. When information is extracted, the image processing unit finishes the processing at that point and outputs the extracted information.

Figure 10:
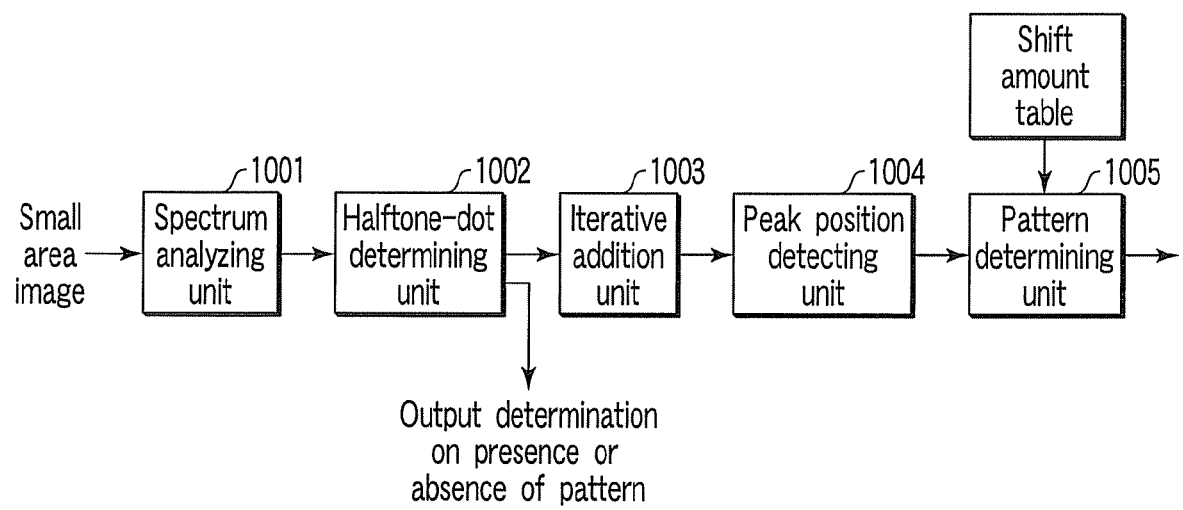
FIG. 10 is a diagram showing a flow of a buried information extraction processing operation in the fourth embodiment.

The information extraction processing in step SC3 is explained. A processing flow configuration of the information extraction processing is shown in FIG. 10. First, spectrum analysis 1001 is applied to the small area of the image selected in step SC2. Here, two-dimensional frequency analysis for an image signal is performed. Specifically, a DFT (Discrete Fourier Transform) calculation is performed. When the processing is performed by software, a fast algorithm such as FFT (Fast Fourier Transform) may be used.

Next, a halftone-dot determining unit 1002 determines whether a pattern in which information is buried is included in the selected small area. When it is determined that the pattern is included, the halftone-dot determining unit 1002 detects and outputs a frequency of the pattern.

In other words, since the pattern in which information is buried is present only in a base area of an original and a halftone area having density equal to or lower than predetermined density, the halftone-dot determining unit 1002 performs this determination. Since it is likely that skew occurs during scanning of an original and, if magnification accuracy of a scanner is low, rotation and a change in magnification occur. Thus, when detection of the skew, the rotation, and the change in magnification is performed, extraction accuracy does not fall even if a low-cost scanner and the like are used.

In this embodiment, the halftone-dot determining unit 1002 determines presence or absence of a pattern according to presence or absence of a frequency peak corresponding to a dot period forming a buried pattern. In other words, the halftone-dot determining unit 1002 detects a frequency having a peak equal to or higher than predetermined intensity of an output of the spectrum analyzing unit 1001.

The halftone-dot determining unit 1002 compares this detected frequency and a frequency of the dot period of the buried pattern. A frequency of the buried pattern depends on the dot period. In particular, in the case of an orthogonal pattern in which two dot period vectors are orthogonal to each other as in this embodiment, when the dot period vectors are (x1, y1) and (x2, y2), the pattern has strong peaks in two basic frequencies of (u1, v1)=(1/x1, 1/y1) and (u2, v2)=(1/x2, 1/y2) and a frequency of a linear sum of these basic frequencies.

Therefore, when a peak frequency detected by spectrum analysis is equal to (u1, v1) or (u2, v2) described above, the halftone-dot determining unit 1002 can determine that the pattern is present. When rotation due to scanning skew and a change in magnification due to an error in a scanning magnification occur during scanning of an image, the detected peak frequency is also subjected to the rotation and the change in magnification (in the inverse of a scanning magnification) accordingly.

Therefore, when the detected peak frequency is equal to the frequency of the dot period according to a combination of the rotation and the change in magnification, the halftone-dot determining unit 1002 can determine that there is the buried pattern.

On the other hand, when the frequency peak is not present, when the intensity of the peak is low, or when the peak frequency is quite different from the frequency of the dot period of the pattern, the halftone-dot determining unit 1002 determines that there is no pattern.

Examples of results of the spectrum analysis are shown in FIGS. 11A, 11B, and 11C. A circle represents a frequency of a dot period of a pattern. An X represents a peak frequency as a result of the spectrum analysis.

In FIG. 11A, the peak coincides with the frequency of the dot period of the pattern. In FIG. 11B, the frequency peak deviates from the frequency of the dot period. However, when a change in magnification of 1.1 times is performed after a position of the frequency peak is rotated, the frequency peak overlaps the frequency of the dot period. Therefore, the halftone-dot determining unit 1002 determines that a pattern same as the pattern of the dot frequency is included in detected information. In FIG. 11C, although the frequency peak is present, the frequency peak is quite different from the frequency of the dot period and the halftone-dot determining unit 1002 determines that no buried pattern is present. In the case of FIGS. 11A and 11B, the halftone-dot determining unit 1002 determines that a buried pattern is present and a peak frequency of the buried pattern is outputted.

An iterative addition unit 1003 applies an iterative addition at the period of the pattern to the original image. In the buried pattern, since the same pattern is repeated with the period as a unit, by adding up repeated patterns, structure information of the pattern is kept and, on the other hand, it is possible to reduce noise and the like. A schematic diagram of the iterative addition is shown in FIG. 12.

Figure 13:
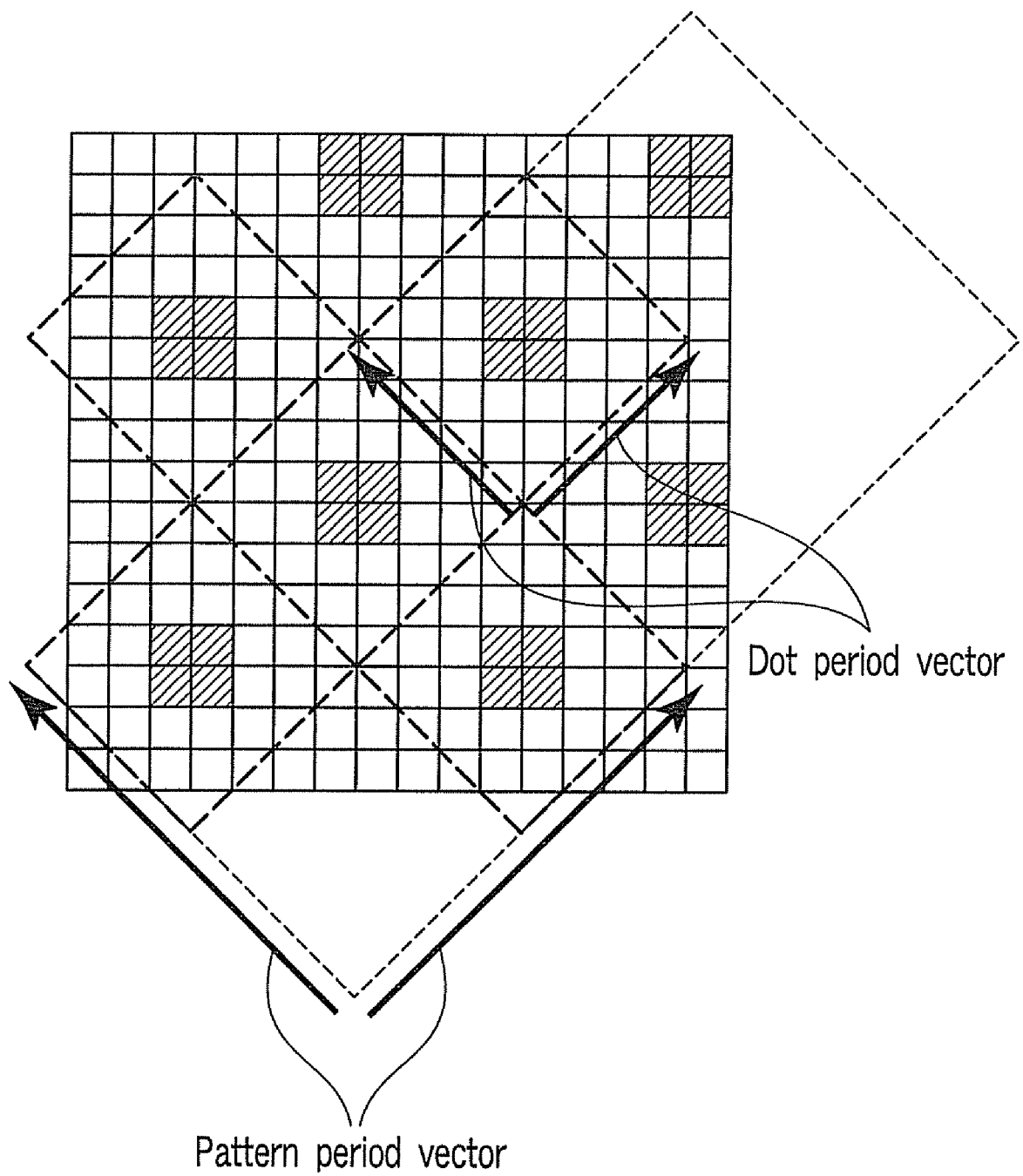
FIG. 13 is a diagram for explaining dot period vectors and pattern period vectors.

First, the iterative addition unit 1003 calculates a dot frequency from the frequency of the dot period calculated in the preceding step. In the case of the orthogonal pattern, since a component of a dot period vector is the inverse of the frequency of the dot frequency, it is possible to easily calculate the component. Next, the iterative addition unit 1003 calculates vectors of the pattern frequency. As shown in FIG. 13, dot period vectors and pattern period vectors are found.

The pattern period vectors are integer times as large as the dot period vectors and a ratio of the pattern period vectors to the dot period vectors is a preset value depending on a pattern. Thus, the ratio can be calculated according to the preset value. In this embodiment, the ratio is two times.

Consequently, since the period of the pattern can be calculated, integration is performed by shifting the period vectors by this period. A formula for the integration is shown below.

$$Q(x, y) = \Sigma i,j\ P(x+i^*xp1+j^*xp2,\ y+i^*yp1+j^*yp2)/N$$

where Q(x, y) is a result of the integration, P(x, y) is a read image signal, and (xp1, yp1) and (xp2, yp2) are period vectors of the pattern.

Further, i and j are selected such that a pixel moves in a range of a small area.

N is the number of integrations.

When a pattern period is not an integer, since a coordinate value is not an integer, a pixel value cannot be directly calculated. However, the pixel value is estimated using an interpolation operation.

FIG. 12 is a schematic diagram of iterative addition processing for obtaining dot period vectors and pattern period vectors. Pixel values detected at the pattern period equivalent to plural small areas are added up and an average of the pixel values is calculated. In FIG. 12, an example in which an average of pixel values at nine points is calculated is shown. A peak detecting unit 1004 calculates four peak positions in this iterative pattern. In other words, the peak detecting unit 1004 calculates a coordinate value that takes a maximum value. After performing inverse correction of rotation and a change in magnification, the peak detecting unit 1004 calculates relative coordinates of the other three points from one peak. The coordinates correspond to shift amounts of halftone dots in the buried pattern. A pattern determining unit 1005 compares a set of the shift amounts obtained in this way with a table of shift amounts of patterns designed initially and detects a pattern corresponding to shift amounts closest to the set of the shift amounts as a buried pattern. It is possible to output buried information corresponding to this pattern as a bit value.

According to the processing described above, it is possible to extract the buried information. In this embodiment, by detecting a halftone dot period pattern and comparing the halftone dot period with a period of a halftone dot of an original pattern as described above, even if a change in magnification and rotation occurs during scanning, it is possible to correct the change in magnification and the rotation. By performing the iterative addition of pattern periods in a small area, it is possible to perform information extraction that is not easily affected by noise and the like.

The method of extracting information described above has means for inputting an image and means for extracting plural small areas from the image. Moreover, the method has means for performing spectrum analysis for images of the plural small areas and means for determining presence or absence of a predetermined pattern of pixels from a result of the spectrum analyzing means. The method further includes means for applying iterative addition to pixels of the predetermined pattern of the plural small areas, means for calculating a position of a peak pixel with respect to an output of the iterative addition means, and means for extracting buried information from information on calculated plural peak positions.

As explained above, by using the present invention, it is possible to bury information in an image in a form visually close to halftone dots and it is possible to perform information burying with low feeling of noise. Since the information is buried in a form of a relative position change in dot positions of the halftone dots, information concerning a reference position such as register is unnecessary and it is possible to reproduce information only with processing for patterns. Since the patterns have a periodical iterative structure, by performing extraction processing after integrating the patterns at this iterative period, it is possible to perform information extraction with high stability against noise such as stain on a paper surface.

The present invention is not limited to the embodiments per se. At an implementation stage, the elements of the present invention can be modified and embodied without departing from the spirit of the present invention. Various inventions can be formed by appropriate combinations of the plural elements disclosed in the embodiments. For example, several elements may be deleted from all the elements described in the embodiments. Moreover, the elements described in the different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method for an apparatus having an input unit that inputs an original image and a halftone processing unit that applies halftone processing to a predetermined area of the original image, the image processing method comprising processing for:

selecting buried information; and shifting dots of a halftone pattern in the halftone processing according to the selected buried information, wherein, in the halftone processing, the shift of the dots is performed only in an area in which density is equal to or lower than predetermined density.

2. An image processing method according to claim 1, wherein the shift of the dots is performed according to shift of halftone dots.

3. The image processing method of claim 1, wherein the halftone processing employs a dither method, and as a dither pattern, a pattern of halftone dot type having a regular period is used.

4. The image processing method of claim 1, wherein further processing comprising:
  detecting a size of a halftone dot;
  shifting the halftone dot when the halftone dot is smaller than a predetermined size.

5. The image processing method of claim 1, wherein a dither threshold pattern for creating a dither pattern in which a halftone dot position is shifted is switched according to information to be buried.

6. A buried information detecting apparatus comprising:
  an input unit configured to input an image including a halftone processed area in which density is equal to or lower than predetermined density;
  a first extracting unit configured to extract plural small areas from the image in the half tone processed area;
  an analyzing unit configured to apply spectrum analysis to each of images of the plural small areas;
  a determining unit configured to determine presence or absence of a predetermined pattern of pixels from a result of means for performing the spectrum analysis;
  an adding unit configured to apply iterative addition to the pixels of the predetermined pattern in the plural small areas;
  a position calculating unit configured to calculate a position of a peak pixel with respect to an output of means for performing the iterative addition; and
  a second extracting unit configured to extract buried information from information concerning calculated plural peak positions.

7. An image processing apparatus comprising:
  an input unit that inputs an original image;
  a halftone processing unit that applies halftone processing to a predetermined area of the original image;
  a selecting unit that selects buried information; and
  a shifting unit that shifts dots of a halftone pattern in the halftone processing according to the selected buried information, wherein, in the halftone processing, the shift of the dots is performed only in an area in which density is equal to or lower than predetermined density.

8. An image processing apparatus according to claim 7, wherein the shift of the dots is performed according to shift of halftone dots.

9. The image processing apparatus of claim 7, wherein in the halftone processed area, the halftone processing employs a dither method, and as a dither pattern, a pattern of a halftone dot type having a regular period is used.

10. The image processing apparatus of claim 7, wherein a size of a halftone dot in the halftone processed area is detected, and the halftone dot is shifted when the halftone dot is smaller than a predetermined size.

11. The image processing apparatus of claim 7, wherein a dither threshold pattern for creating a dither pattern in which a halftone dot position is shifted is switched according to information to be buried in the halftone processed area.

* * * * *